United States Patent
Seo et al.

(10) Patent No.: US 9,300,456 B2
(45) Date of Patent: *Mar. 29, 2016

(54) METHOD AND APPARATUS FOR TRANSMITTING ACK/NACK FOR DOWNLINK TRANSMISSION IN WIRELESS COMMUNICATION SYSTEM

(71) Applicant: LG ELECTRONICS INC., Seoul (KR)

(72) Inventors: Hanbyul Seo, Anyang-si (KR); Suckchel Yang, Anyang-si (KR); Kijun Kim, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,394

(22) Filed: May 1, 2015

(65) Prior Publication Data

US 2015/0236836 A1    Aug. 20, 2015

Related U.S. Application Data

(63) Continuation of application No. 13/879,978, filed as application No. PCT/KR2011/008915 on Nov. 22, 2011.

(60) Provisional application No. 61/416,274, filed on Nov. 22, 2010, provisional application No. 61/444,997, filed on Feb. 21, 2011.

(30) Foreign Application Priority Data

Nov. 3, 2011    (KR) .......................... 10-2011-0113835

(51) Int. Cl.
*H04W 72/04*    (2009.01)
*H04L 1/18*    (2006.01)

(Continued)

(52) U.S. Cl.
CPC ............... *H04L 5/0055* (2013.01); *H04L 1/08* (2013.01); *H04L 1/1829* (2013.01); *H04L 5/14* (2013.01); *H04W 72/042* (2013.01)

(58) Field of Classification Search
CPC ......................... H04W 72/1284; H04W 72/14
See application file for complete search history.

(56) References Cited

U.S. PATENT DOCUMENTS

2009/0323617 A1    12/2009  Che et al.
2010/0159935 A1*   6/2010   Cai ..................... H04W 72/042
                                                    455/450

(Continued)

OTHER PUBLICATIONS

3GPP, ETSI TS 36.213, Version 9.3.0, Release 9, Published Oct. 3, 2010, pp. 70-77.*

(Continued)

*Primary Examiner* — Kodzovi Acolatse
(74) *Attorney, Agent, or Firm* — Birch, Stewart, Kolasch & Birch, LLP

(57) ABSTRACT

A method for receiving ACK/NACK information transmitted in response to a downlink transmission. The method according to one embodiment includes transmitting one or more relay physical downlink control channels (R-PDCCHs); transmitting the downlink transmission according to the one or more R-PDCCHs in a downlink subframe set including M downlink subframes, where M is a positive integer; and receiving ACK/NACK information for the downlink transmission in the downlink subframe set. The downlink subframe set and the uplink subframe are configured for a time division duplex (TDD). The one or more R-PDCCHs are control channels different from a physical downlink control channel (PDCCH). N physical uplink control channel (PUCCH) resources respectively having indexes 0, 1, 2, ..., and N−1 are configured by a higher layer, where N is a positive integer and M≤N. Each of M PUCCH resources corresponds to each of the M downlink subframes.

8 Claims, 13 Drawing Sheets

(51) Int. Cl.
*H04L 5/00* (2006.01)
*H04L 1/08* (2006.01)
*H04L 5/14* (2006.01)

(56) References Cited

U.S. PATENT DOCUMENTS

| | | |
|---|---|---|
| 2010/0275083 A1 | 10/2010 | Nam et al. |
| 2010/0316096 A1* | 12/2010 | Adjakple ............ H04L 1/1887 375/211 |
| 2010/0331037 A1 | 12/2010 | Jen |
| 2011/0103295 A1 | 5/2011 | Khandekar et al. |
| 2011/0134774 A1 | 6/2011 | Pelletier et al. |
| 2011/0149774 A1* | 6/2011 | Chen ............ H04L 1/1854 370/252 |
| 2011/0199985 A1* | 8/2011 | Cai ............ H04L 1/0026 370/329 |
| 2011/0267991 A1 | 11/2011 | Damnjanovic et al. |
| 2011/0274031 A1* | 11/2011 | Gaal ............ H04L 5/0051 370/315 |
| 2011/0310789 A1 | 12/2011 | Hu et al. |
| 2011/0310792 A1 | 12/2011 | Lee et al. |
| 2012/0015662 A1 | 1/2012 | Zhang et al. |
| 2012/0044890 A1 | 2/2012 | Jen |
| 2012/0069778 A1* | 3/2012 | Zhang ............ H04L 5/14 370/279 |
| 2012/0120924 A1 | 5/2012 | Montojo et al. |
| 2013/0315109 A1 | 11/2013 | Raaf et al. |
| 2014/0161001 A1* | 6/2014 | Gao ............ H04W 72/0446 370/280 |

OTHER PUBLICATIONS

3GPP, "Evolved Universal Terrestrial Radio Access Physical Layer Procedures", Oct. 3, 2010, 3GPP, Version 9.3.0, Release 9, Pertinent pp. 70-77.
LG Electronics, "ACK/NACK no PUCCH for TDD", 3GPP TSG RAN WG1 Meeting #63, R1-106099, Nov. 15-19, 2010, pp. 1-14.
Panasonic, "Resource allocation schemes of R-PDCCH", 3GPP TSG RAN WG1 Meeting #63, R1-106087, Nov. 15-19, 2010, pp. 1-7.
Qualcomm Incorporated, "PUCCH resources for multi-bit ACK and resource indexing", 3GPP TSG RAN WG1 #63, R1-106342, Nov. 15-19, 2010, pp. 1-3.
Research in Motion, UK Limited, "PUCCH resource allocation for channel selection with Tx diversity", 3GPP TSG RAN WG1 Meeting #62bis, R1-105511, Oct. 11-15, 2010, pp. 1-4.
3GPP, "LTE; Evolved Universal Terrestrial Radio Access (E-UTRA); Physical layer procedures (3GPP TS 36.213 version 9.3.0 Release 9)", ETSI TS 136 213, V9.3.0, Oct. 2010, pp. 1-81.
Catt, "Remaining Details on PUCCH Format 3 in Rel-10", 3GPP TSG RAN WG1 Meeting #62bis, R1-105152, Oct. 11-15, 2010, 3 pages.
Nokia et al., "Acknowledgement for explicit UL SPS release in Lte Rel'9", 3GPP TSG RAN WG1 #58bis Meeting, R1-093894, Oct. 12-16, 2009, 12 pages.

* cited by examiner (a)

(b)

(a)

(b)

(a)

(b)

m PDSCH transmission DL subframe

UL subframe associated with M DL subframes

METHOD AND APPARATUS FOR TRANSMITTING ACK/NACK FOR DOWNLINK TRANSMISSION IN WIRELESS COMMUNICATION SYSTEM

CROSS-REFERENCE TO RELATED APPLICATIONS

This application is a Continuation of copending application Ser. No. 13/879,978, filed on Apr. 17, 2013, which was filed as the National Phase of PCT International Application No PCT/KR2011/008915 filed on Nov. 22, 2011, which claims the benefit under 35 U.S.C. §119(e) to U.S. Provisional Application Nos. 61/416,274 filed on Nov. 22, 2010 and 61/444,997 filed on Feb. 21, 2011, and under 35 U.S.C. §119(a) to Patent Application No. 10-2011-0113835 filed in Korea on Nov. 3, 2011, all of which are hereby expressly incorporated by reference into the present application.

BACKGROUND

1. Field of the Invention

The present invention relates to a wireless communication system, and more particularly, to a method and apparatus for transmitting ACK/NACK for downlink transmission in a wireless communication system.

2. Discussion of the Related Art

In a wireless communication system, in order to determine whether data transmitted by a transmitter is successfully received by a receiver, the receiver may feed acknowledgement (ACK)/negative ACK (HACK) back to the transmitter. The transmitter performs an operation such as retransmission of previously transmitted data or transmission of new data based on the ACK/NACK feedback, thereby efficiently and accurately performing data transmission.

For example, in case of downlink transmission from a base station to a user equipment (UE), the UE which receives a physical downlink shared channel (PDSCH) in downlink subframe(s) may feed ACK/NACK information indicating whether or not the PDSCH is successfully received back to the base station after a predetermined time has elapsed, and the base station may receive the ACK/NACK information in one uplink subframe. In order to enable the base station to accurately receive the ACK/NACK information transmitted by the UE, resources used to transmit the ACK/NACK information in one uplink subframe need to be determined.

SUMMARY OF THE INVENTION

In a conventional wireless communication system, ACK/NACK resources may be determined according to a predetermined rule. However, in an evolved wireless communication system to which carrier aggregation technology or relay technology is applied, ACK/NACK resources may not be determined according to the conventional method.

An object of the present invention devised to solve the problem lies in a method for determining ACK/NACK resources used to transmit ACK/NACK for downlink transmission in an evolved wireless communication system.

The object of the present invention can be achieved by providing a method for transmitting ACK/NACK information for downlink transmission in a receiver of a wireless communication system, including being configured with N physical uplink control channel (PUCCH) resources respectively having indexes 0, 1, 2, . . . , and N−1 by a higher layer, receiving the downlink transmission from a transmitter in a downlink subframe set including M (1≤M≤N) downlink subframes, and transmitting the ACK/NACK information for the downlink transmission in the downlink subframe set to the transmitter in one uplink subframe associated with the downlink subframe set, wherein each of the M PUCCH resources respectively having the indexes 0, 1, 2, . . . , and M−1 among the N PUCCH resources configured with respect to the receiver corresponds to each of the M downlink subframes.

In another aspect of the present invention, provided herein is an apparatus for transmitting ACK/NACK information for downlink transmission in a wireless communication system, including a reception module configured to receive a downlink signal from a transmitter, a transmission module configured to transmit an uplink signal to the transmitter, and a processor configured to control the apparatus including the reception module and the transmission module, wherein the processor is further configured to be configured with N physical uplink control channel (PUCCH) resources respectively having indexes 0, 1, 2, . . . , and N−1 by a higher layer, receive the downlink transmission from the transmitter in a downlink subframe set including M (1≤M≤N) downlink subframes, and transmit the ACK/NACK information for the downlink transmission in the downlink subframe set to the transmitter in one uplink subframe associated with the downlink subframe set, wherein each of the M PUCCH resources respectively having the indexes 0, 1, 2, . . . , and M−1 among the N PUCCH resources configured with respect to the receiver corresponds to each of the M downlink subframes.

The following matters may be applied to the embodiments of the present invention.

The one uplink subframe may be a subframe n, the M downlink subframes may be subframe n−$k_t$ (t=0, 1, 2, . . . , and M−1), the M PUCCH resources may be $n^{(1)}_{PUCCH,t}$ (t=0, 1, 2, . . . , M−1), and $n^{(1)}_{PUCCH,t}$ may correspond to the subframe n−$k_t$.

The $k_t$ value may correspond to t=0, 1, 2, . . . in ascending order.

The ACK/NACK information may be transmitted using one of the M PUCCH resources.

ACK/NACK bundling or ACK/NACK channel selection may be set with respect to the receiver.

The downlink transmission may be a physical downlink shared channel (PDSCH) transmission indicated by detection of a corresponding control channel.

The control channel may be a relay-physical downlink control channel (R-PDCCH).

The control channel may include control channel number count information.

The wireless communication system may be a time division duplexing (TDD) system.

The transmitter may be a base station and the receiver may be a relay node.

The above-described description and the following detailed description of the present invention are exemplary and are provided for additional description of the appended claims.

According to the present invention, it is possible to provide a method for determining ACK/NACK resources used to transmit ACK/NACK for downlink transmission in an evolved wireless communication system.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention. In the drawings.

DETAILED DESCRIPTION OF THE INVENTION

Figure 1:
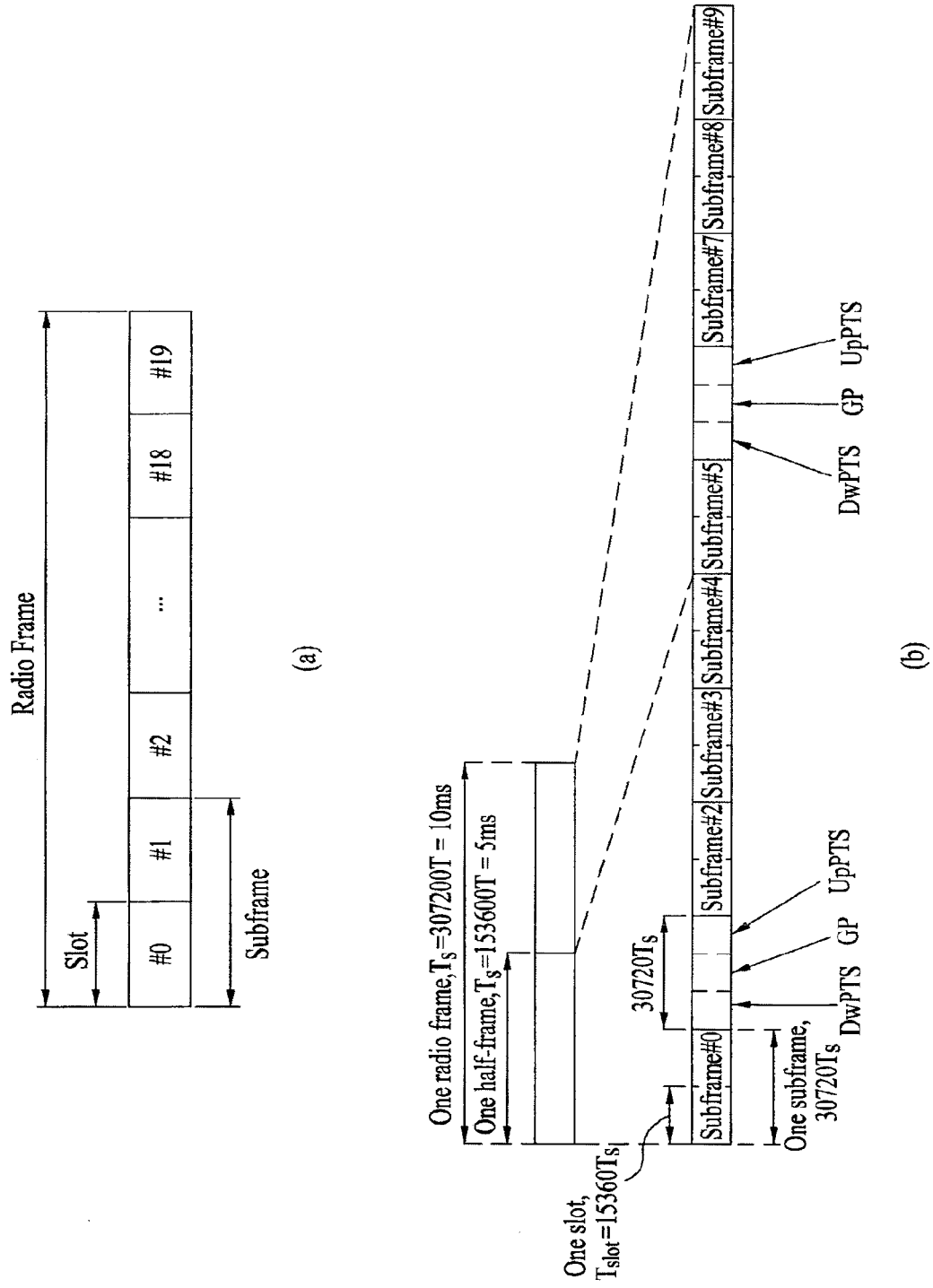
FIG. 1 is a diagram showing the structure of a downlink radio frame.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE—Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

FIG. 1(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 2:
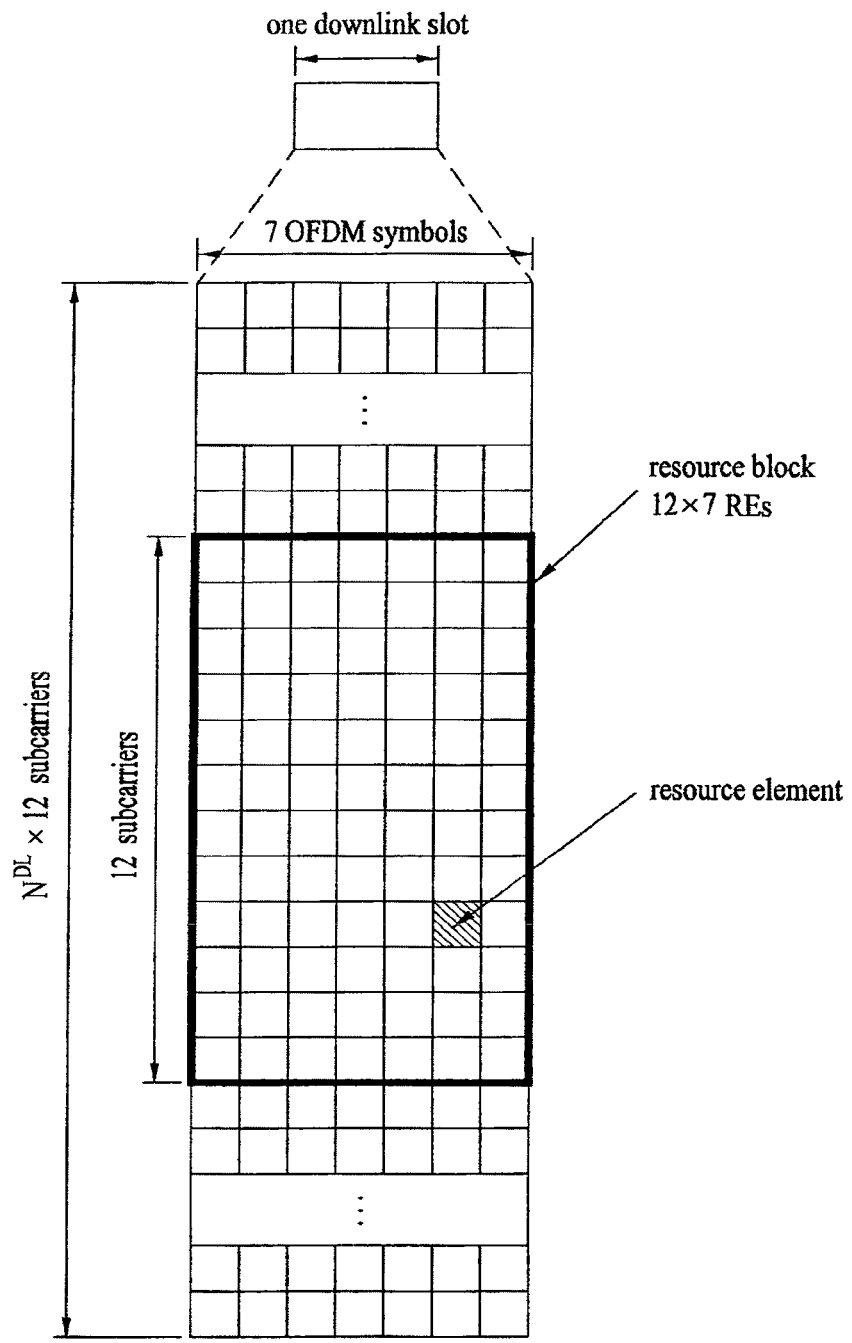
FIG. 2 is a diagram showing a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 3:
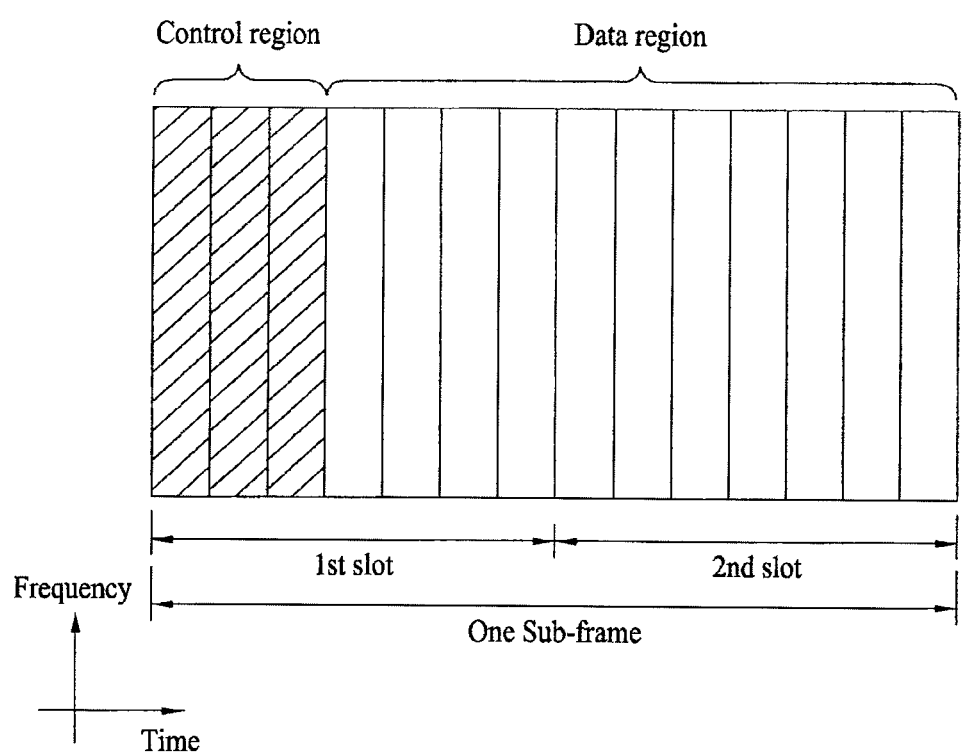
FIG. 3 is a diagram showing the structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
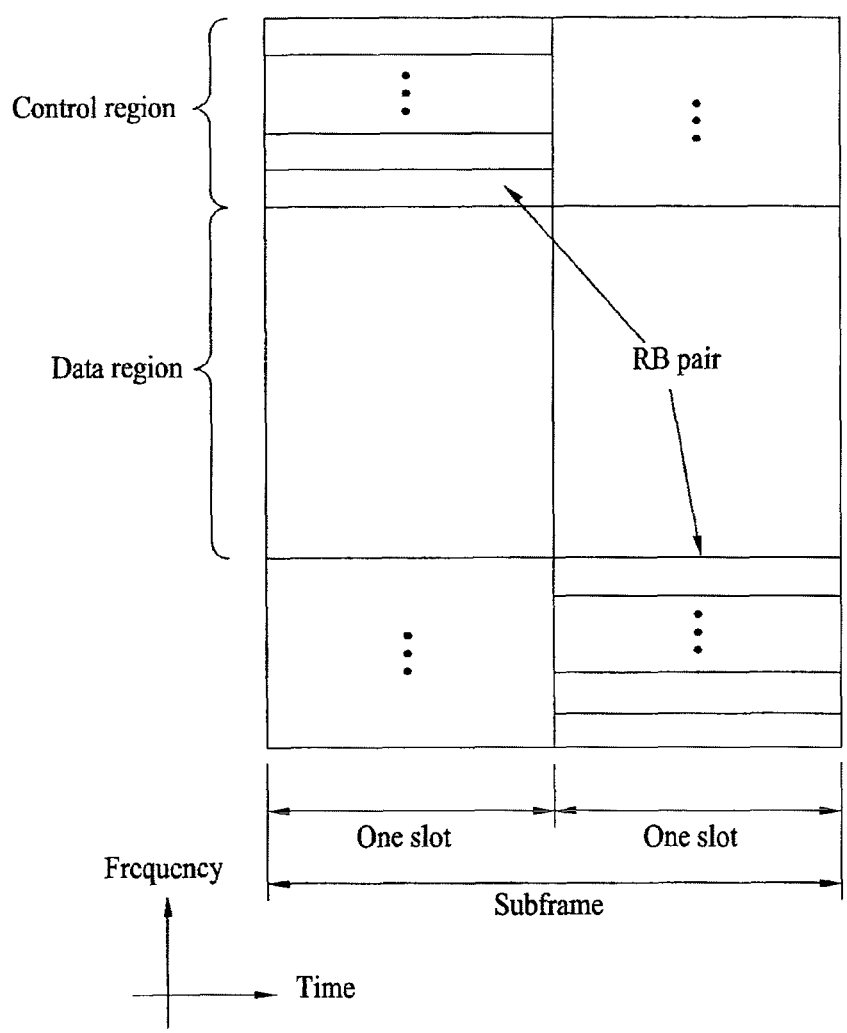
FIG. 4 is a diagram showing the structure of an uplink subframe.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

Figure 5:
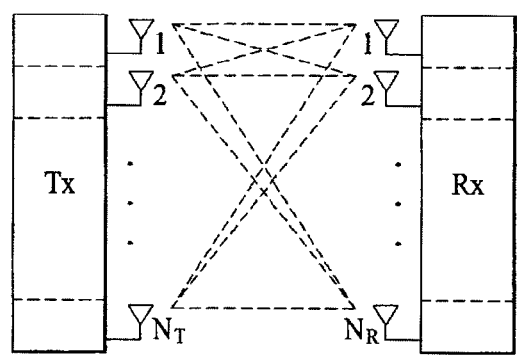
FIG. 5 is a diagram showing the configuration of a wireless communication system having multiple antennas.
Figure 5:
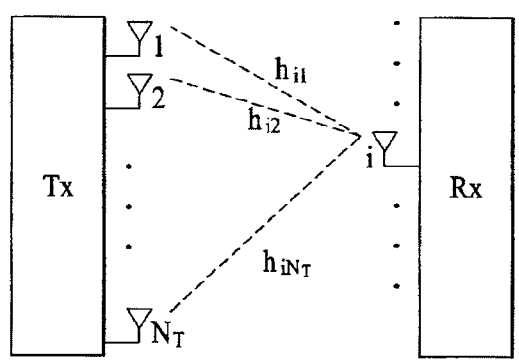

FIG. 5 is a diagram showing the configuration of a radio communication system having multiple antennas.

As shown in FIG. 5(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon using a single antenna and a rate increase ratio $R_i$.

$$R_i = \min(N_T, N_R) \quad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \quad \text{Equation 2}$$

The transmitted information $s_1, s_2, \ldots, s_{N_T}$ may have different transmit powers. If the respective transmit powers are $P_1, P_2, \ldots P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Equation 3}$$

In addition, $\hat{s}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Consider that the $N_T$ actually transmitted signals $x_1, x_2, \ldots, X_{N_T}$ are configured by applying a weight matrix W to the information vector $\hat{s}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 5}$$

where, $w_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \quad \text{Equation 6}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 5(b) is a diagram showing channels from the $N_T$ transmission antennas to the reception antenna i. The channels may be combined and expressed in the form of a vector and a matrix. In FIG. 6(b), the channels from the $N_T$ transmission antennas to the reception antenna i may be expressed as follows.

$$h_i^T = [h_{i1}, h_{i2}, \ldots, h_{iN_T}] \quad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{Equation 8}$$

An Additive White Gaussian Noise (AWGN) is added to the actual channels after a channel matrix H. The AWGN $n_1, n_2, \ldots, n_{N_R}$ added to the $N_T$ transmission antennas may be expressed as follows.

$$n = [n_1, n_2, \ldots, n_{N_R}]^T \quad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

$$Hx + n \qquad \text{Equation 10}$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 6:
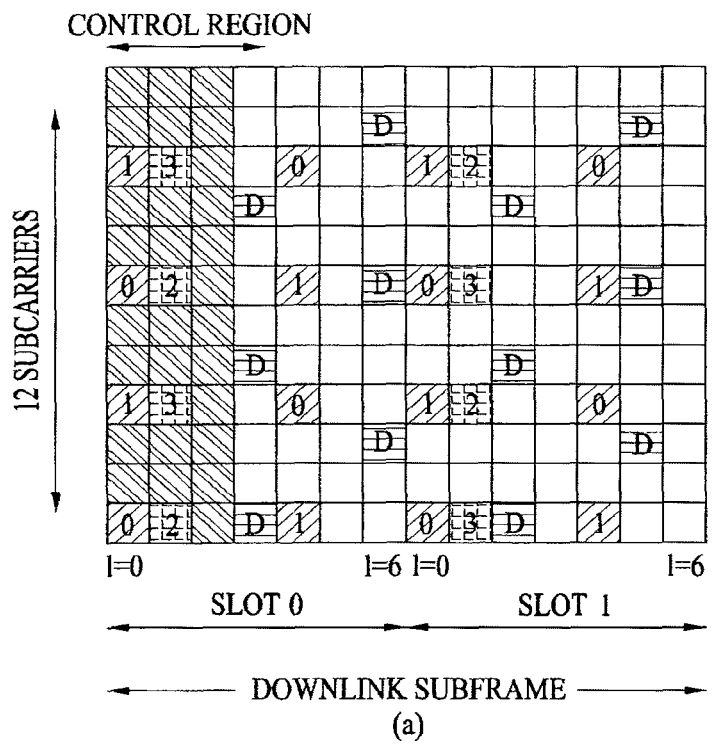
FIG. 6 is a diagram showing a CRS and DRS pattern defined in the existing 3GPP LTE system.
Figure 6:
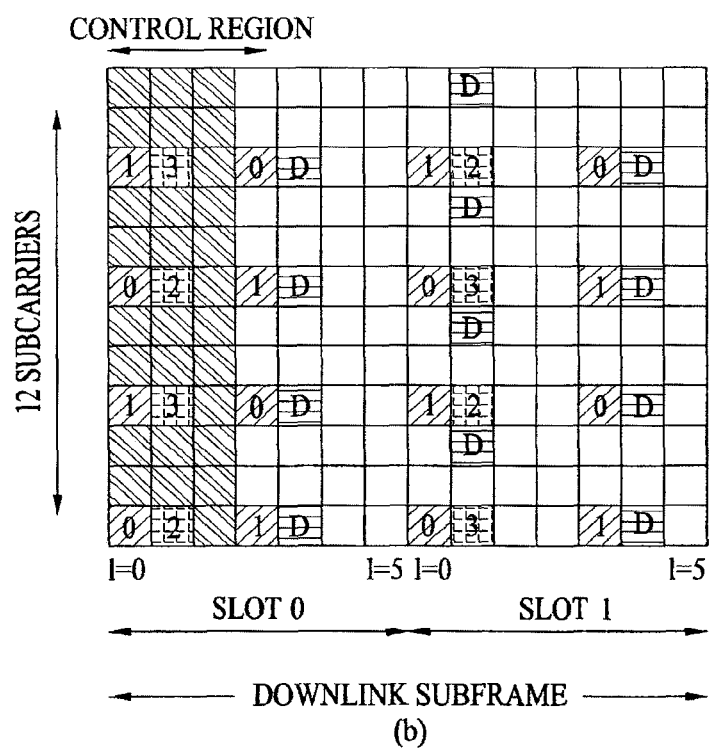

FIG. 6 is a diagram showing a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP (FIG. 6(a)) and has a length of 12 OFDM symbols in case of the extended CP (FIG. 6(b)).

FIG. 6 shows the locations of the RSs on the RB pair in the system in which the eNodeB supports four transmission antennas. In FIG. 6, Resource Elements (REs) denoted by "0", "1", "2" and "3" indicate the locations of the CRSs of the antenna port indexes 0, 1, 2 and 3, respectively. In FIG. 6, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6 \qquad \text{Equation 12}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3 k-th subcarriers in one cell and arranged on (3 k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \qquad \text{Equation 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{Equation 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index. $N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "SrsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 7:
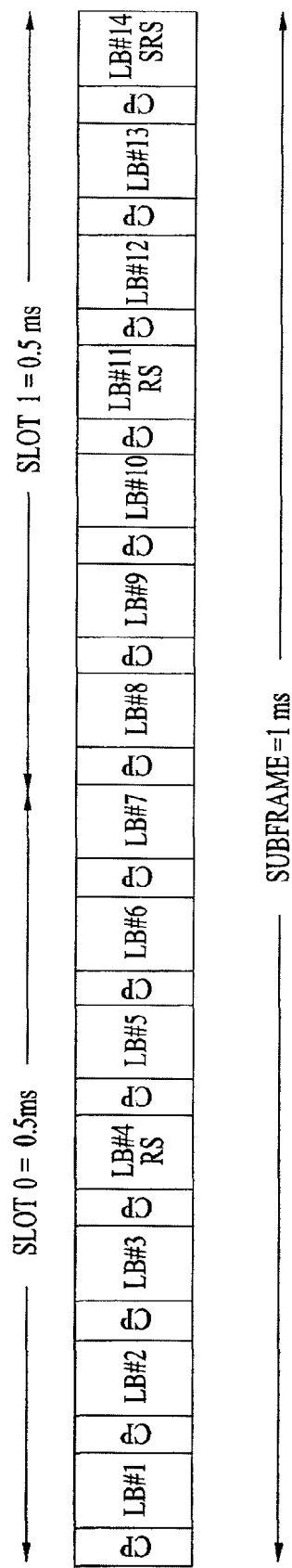
FIG. 7 is a diagram showing the structure of an uplink subframe including SRS symbols.

As shown in FIG. 7, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

An RN may be considered for, for example, enlargement of high data rate coverage, improvement of group mobility, temporary network deployment, improvement of cell edge throughput and/or provision of network coverage to a new area.

An RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 8:
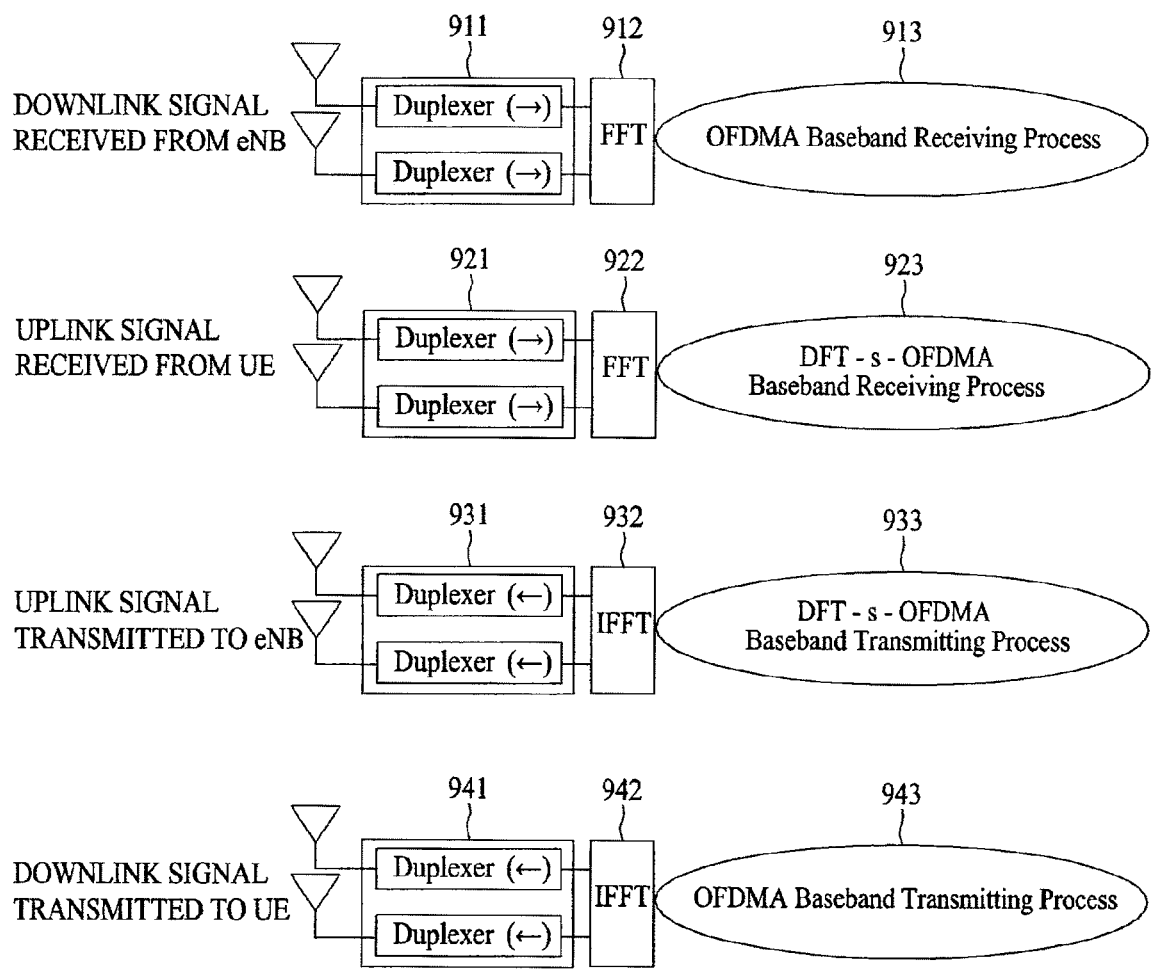
FIG. 8 is a diagram showing an example of implementation of a transmitter/receiver function of an FDD mode relay node (RN)

FIG. 8 is a diagram showing an example of implementing transmission and reception functions of an FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse FFT (IFFT) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into an RN configured as a part of the donor cell or an RN for controlling the cell.

The RN configured as the part of the donor cell may have an RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using an FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated form each other (for example, on the ground or under the ground) in terms of geographical positions).

Figure 9:
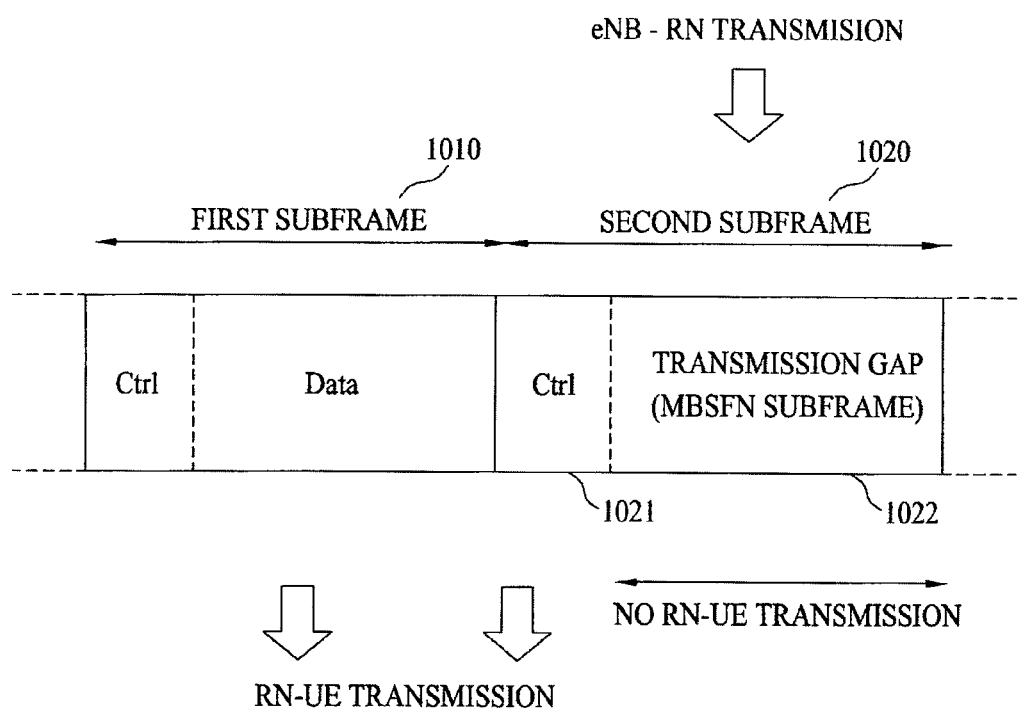
FIG. 9 is a diagram illustrating transmission from an RN to a UE and downlink transmission from an eNB to an RN.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 9). In FIG. 9, a first subframe 1010 is a general subframe, in which a downlink (that is, access downlink) control signal and data is transmitted from the RN to the UE, and a second subframe 1020 is an MBSFN subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The MBSFN subframe is essentially used for a Multimedia Broadcast and Multicast Service (MBMS) which simultaneously transmits the same signal in the same cell. The control region 1021 of the second subframe may be an RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by a R-PDCCH (Relay-PDCCH) and a R-PDSCH (Relay-PDSCH).

Determination of Resources Used to Transmit ACK/NACK Information

ACK/NACK information is control information fed back from a receiver to a transmitter depending on whether data transmitted by the transmitter is successfully decoded. For example, if downlink data is successfully decoded, a UE may feed ACK information back to an eNB and otherwise the UE may feed NACK information back to the eNB. More specifically, the case in which the receiver needs to transmit ACK/NACK in an LTE system is roughly divided into the following three cases.

First, ACK/NACK for PDSCH transmission indicated by PDCCH detection is transmitted. Second, ACK/NACK for a PDCCH indicating semi-persistent scheduling (SPS) release is transmitted. Third, ACK/NACK for a PDSCH transmitted without PDCCH detection, that is, ACK/NACK for SPS PDSCH transmission, is transmitted. In the following description, a method for transmitting ACK/NACK is not limited to any one of the above three cases unless otherwise stated.

Next, resources used to transmit ACK/NACK information in an FDD mode and a TDD mode will be described in detail.

The FDD mode refers to a transmission/reception mode for dividing downlink (DL) and uplink (UL) according to independent frequency bands. Accordingly, when an eNB sends a PDSCH in a DL band, a UE may transmit an ACK/NACK response indicating whether DL data is successfully received through a PUCCH in a UL band corresponding to the DL band after a predetermined time. Accordingly, DL corresponds one-to-one to UL.

More specifically, in the example of the existing 3GPP LTE system, control information for downlink data transmission of an eNB is sent to a UE via a PDCCH and the UE which receives data scheduled via the PDCCH to the UE via a PDSCH may transmit ACK/NACK via a PUCCH for transmitting uplink control information (or is sent via a PUSCH in a piggyback manner). In general, the PUCCH for transmitting the ACK/NACK is not allocated to UEs in advance, but a plurality of UEs in a cell divisionally use a plurality of PUCCHs at each time. Accordingly, as a PUCCH for transmitting ACK/NACK by a UE which receives downlink data at a certain time, a PUCCH corresponding to a PDCCH used to receive scheduling information of downlink data may be used.

The PUCCH corresponding to the PDCCH will be described in greater detail. A region in which the PDCCH of each downlink subframe is transmitted includes a plurality of control channel elements (CCEs) and the PDCCH transmitted to one UE in any subframe includes one or a plurality of CCEs among CCEs configuring the PDCCH region of the subframe. In addition, resources used to transmit a plurality of PUCCHs are present in a region in which a PUCCH of each uplink subframe is transmitted. At this time, the UE may transmit ACK/NACK via a PUCCH having an index corresponding to an index of a specific (e.g., first) CCE of the CCEs configuring the PDCCH received by the UE.

For example, it is assumed that one UE obtains information associated with a PDSCH via a PDCCH including fourth, fifth and sixth CCEs and receives the PDSCH. In this case, ACK/NACK information of the PDSCH may be transmitted via a PUCCH corresponding to the fourth CCE which is a first CCE configuring the PDCCH for scheduling the PDSCH, that is, the fourth PUCCH.

In an FDD system, a UE may transmit HARQ ACK/NACK information at a subframe index n with respect to PDSCH transmission received at a subframe index n−k (e.g., k=4 in the LTE system). The UE may determine a PUCCH resource index used to transmit HARQ ACK/NACK at a subframe n from a PDCCH indicating PDSCH transmission at the subframe n−k.

For example, in the LTE system, a PUCCH resource index is determined as follows.

$$n^{(1)}_{PUCCH} = n_{CCE} + N^{(1)}_{PUCCH} \quad \text{Equation 15}$$

In Equation 15, $n^{(1)}_{PUCCH}$ denotes a resource index of PUCCH format 1 series (e.g., PUCCH format 1a/1b) for transmitting ACK/NACK, $N^{(1)}_{PUCCH}$ denotes a signaling value received from a higher layer, and $n_{CCE}$ denotes the smallest value of CCE indexes used for PDCCH transmission. A cyclic shift, an orthogonal spread code and a physical resource block (PRB) for PUCCH format 1a/1b are obtained from $n^{(1)}_{PUCCH}$.

Next, ACK/NACK transmission of a TDD mode will be described.

In the TDD mode, since downlink transmission and uplink transmission are distinguished according to time, subframes in one radio frame are divided into downlink subframes and uplink subframes. Table 1 shows a UL-DL configuration in the TDD mode.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D denotes a downlink subframe, U denotes an uplink subframe, and S denotes a special subframe. The special subframe includes three fields: Downlink Pilot TimeSlot (DwPTS), Guard Period (GP) and Uplink Pilot TimeSlot (UpPTS). DwPTS denotes a time reserved for downlink transmission and UpPTS denotes a time reserved for uplink transmission.

In a TDD system, a UE may transmit ACK/NACK information for PDSCH transmission of one or more downlink subframes in one uplink subframe. The UE may transmit HARQ ACK/NACK information in an uplink subframe n with respect to PDSCH transmission received in a downlink subframe n−k and a value k may be provided according to the above UL-DL configuration. For example, with respect to the UL-DL configuration of Table 1, a downlink associated set index K: $\{k_0, k_1, \ldots, k_{M-1}\}$ may be applied as shown in Table 2.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

For example, in Table 2, in case of a UL-DL configuration 0, since k=4 in an uplink subframe 9, ACK/NACK information for data received in a downlink subframe 5 (=9−4) may be transmitted in an uplink subframe 9. Hereinafter, a method for determining a PUCCH resource index in ACK/NACK transmission in a TDD system will be described in detail.

In Table 2, it is assumed that the number of elements $\{k_0, k_1, \ldots, k_{M-1}\}$ of the set K is M. For example, in case of a UL-DL configuration 0, the number of elements of the set K for a subframe 2 is 1, and, in case of a UL-DL configuration 2, the number of elements of the set K for a subframe 2 is 4.

For TDD ACK/NACK bundling or TDD ACK/NACK multiplexing of a subframe n with M=1, a UE may determine PUCCH resource $n^{(1)}_{PUCCH}$ for HARQ ACK/NACK in a subframe n as follows.

If a PDCCH indicating PDSCH transmission or SPS release is present in a subframe n−k (k∈K), the UE first selects a p value from among $\{0, 1, 2, 3\}$ so as to satisfy $N_p \leq n_{CCE} \leq N_{p+1}$. The PUCCH resource index $n^{(1)}_{PUCCH}$ may be determined according to Equation 16.

$$n^{(1)}_{PUCCH} = (m-m-1) \times N_p + m \times N_{p+1} + n_{CCE} + N^{(1)}_{PUCCH} \quad \text{Equation 16}$$

In Equation 16, $n^{(1)}_{PUCCH}$ denotes a resource index of PUCCH format 1 for transmitting ACK/NACK, $N^{(1)}_{PUCCH}$ denotes a signaling value received from a higher layer, and $n_{CCE}$ denotes the smallest value of CCE indexes used for PDCCH transmission in a subframe n−$k_m$ ($k_m$ is the smallest value of the set K). $N_p$ may be determined according to Equation 17.

$$N_p = \{0, \lfloor [N_{RB}^{DL} \times (N_{sc}^{RB} \times p - 4)]/36 \rfloor\} \quad \text{Equation 17}$$

In Equation 17, $N_{RB}^{DL}$ denotes a downlink bandwidth configuration and is expressed in units of $N_{sc}^{RB}$. $N_{sc}^{RB}$ is the size of a resource block in a frequency domain and is expressed as the number of subcarriers.

If a PDSCH transmission is present in a subframe n−k (k∈K) without a PDCCH, the value of $n^{(1)}_{PUCCH}$ may be determined by a higher layer configuration.

Meanwhile, for TDD ACK/NACK multiplexing of a subframe n with M>1, the UE may determine PUCCH resources for HARQ ACK/NACK transmission as follows. In the following description, $n^{(1)}_{PUCCH,i}$ (0≤i≤M−1) denotes ACK/NACK resource deduced from a subframe n−$k_i$ and HARQ-ACK(i) denotes an ACK/NACK response from the subframe n−$k_i$.

If a PDCCH indicating PDSCH transmission or SPS release is present in a subframe $n-k_i$ ($k_i \in K$), ACK/NACK resource $n^{(1)}_{PUCCH,i}$ may be determined by Equation 18

$$n_{PUCCH,i}^{(1)} = (M-i-1) \times N_p + i \times N_{p+1} + n_{CCE,i} + N_{PUCCH}^{(1)}$$

In Equation 4, $N^{(1)}_{PUCCH}$ denotes a signaling value received from a higher layer. $n_{CCE,i}$ denotes the smallest value of CCE indexes used for PDCCH in a subframe $n-k_i$. A p value is selected from among {0, 1, 2, 3} so as to satisfy $N_p \le n_{CCE,i} < N_{p+1}$. Np may be determined by Equation 17.

If a PDSCH transmission is present in a subframe $n-k_i$ ($k_i \in K$) without a PDCCH, the value of $n^{(1)}_{PUCCH,i}$ may be determined by a higher layer configuration.

The UE transmits bits b(0) and b(1) on ACK/NACK resource $n^{(1)}_{PUCCH}$ in a subframe n using PUCCH format 1b. The values of b(0) and b(1) and ACK/NACK resource $n^{(1)}_{PUCCH}$ may be generated by channel selection according to Tables 3, 4 and 5. Tables 3, 4 and 5 show transmissions of ACK/NACK multiplexing in case of M=2, M=3 and M=4, respectively. If b(0) and b(1) are mapped to N/A, the UE does not transmit an ACK/NACK response in a subframe n.

TABLE 3

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 4

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 5

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Tables 3, 4 and 5, HARQ-ACK(i) represents a HARQ ACK/NACK/DTX result of an i-th data unit ($0 \le i \le 3$). Discontinuous Transmission (DTX) indicates the case where a data unit corresponding to HARQ-ACK(i) is not transmitted or the UE does not detect the presence of a data unit corresponding to HARQ-ACK(i). In the present specification, the terms HARQ-ACK and ACK/NACK are used interchangeably. A maximum of four PUCCH resources (that is, $n^{(1)}_{PUCCH,0} \sim n^{(1)}_{PUCCH,3}$) may be occupied in association with each data unit. The multiplexed ACK/NACK is transmitted via one PUCCH resource selected from among the occupied PUCCH resources. $n^{(1)}_{PUCCH,x}$, described in Tables 3, 4 and 5, denotes PUCCH resources used to actually transmit ACK/NACK. b(0) and b(1) indicate two bits transmitted via selected PUCCH resources and are modulated using a QPSK scheme. For example, as shown in Table 5, if the UE successfully decodes four data units, the UE transmits (1, 1) to the eNB via PUCCH resources associated with $n^{(1)}_{PUCCH,1}$. Since it is difficult to represent all ACK/NACK for possible combinations of PUCCH resources and QPSK symbols, NACK and DTX are coupled (expressed by NACK/DTX) except in some cases.

Method of Using Plurality of ACK/NACK Resources

As described above, a receiver which receives a PDSCH via downlink resources feeds ACK/NACK information, which is a signal indicating whether the PDSCH is successfully received, back to a transmitter after a predetermined processing time has elapsed. In the 3GPP LTE system, ACK/NACK for a PDSCH received in a DL subframe n–k is transmitted in a UL subframe n, wherein k=4 in an FDD system and k is determined as shown in Table 2 in a TDD system. In the following description, from the viewpoint of uplink ACK/NACK transmission for downlink transmission, in the relationship between the UL subframe n and the DL subframe n–k, it may be represented that the UL subframe n and the DL subframe n–k are associated with each other (correspond to each other or are mapped to each other).

As described above, in an ACK/NACK transmission method, an ACK/NACK response used in one UL subframe is determined. For example, if ACK/NACK resources are dynamically allocated by a PDCCH for scheduling a PDSCH (e.g., a method of inducing ACK/NACK resources from CCE indexes of the PDCCH), all receivers may accurately recognize which ACK/NACK resources are used on the assumption that the PDCCH is accurately detected. As another example, in case of SPS in which PDSCH resources are semi-statically determined, since one SPS is allocated to one receiver and one ACK/NACK resource to be used in the SPS is semi-statically allocated (e.g., a method of allocating any one of a PUCCH resource index set configured by a higher layer according to a value of a transmit power control (TPC) field (2-bit) in a PDCCH indicating SPS activation), the receiver may recognize using which ACK/NACK resources the PDSCH is successfully received.

However, in an evolved wireless communication system to which carrier aggregation technology or relay technology is applied, ACK/NACK resources used in one UL subframe may not be obvious.

For example, in a relay node (RN) defined in the 3GPP LTE-A system, when the RN performs an in-band operation, a PDCCH cannot be received (as shown in FIG. 9, since the RN should transmit the PDCCH to the UE in all downlink subframes, the PDCCH cannot be received from the eNB). Thus, scheduling information of a PDSCH can be received via an R-PDCCH which is a control channel different from the PDCCH.

Since the RN cannot be dynamically allocated ACK/NACK resources by the PDCCH unlike the UE, the RN may be semi-statically allocated ACK/NACK resources via higher layer signal. In case of the RN which may receive MIMO transmission, since a maximum of two codewords may be transmitted via one PDSCH, in order to report a result of decoding each code, a set of two ACK/NACK resources may be allocated. Only one ACK/NACK resource of an ACK/NACK resource set is used for transmission of one codeword and both ACK/NACK resources of the ACK/NACK resource set are used for transmission of two codewords, thereby performing ACK/NACK transmission for a maximum of two codewords.

In case of the RN which is semi-statically allocated ACK/NACK resources, the number of DL subframes associated with one UL subframe may be changed over time. From the viewpoint of ACK/NACK transmission, one DL subframe is associated with one UL subframe in the existing FDD system, and one or a plurality of DL subframes is associated with one UL subframe in the TDD system. However, in the evolved wireless communication system, even in the FDD system, one UL subframe may be associated with one or a plurality of DL subframes. That is, in the FDD system or the TDD system, if ACK/NACK for downlink transmission in X DL subframes is transmitted in one UL subframe, X≥1. In this case, since which ACK/NACK resources are used in one UL subframe is not obvious, ACK/NACK transmission may not be accurately performed.

Figure 10:
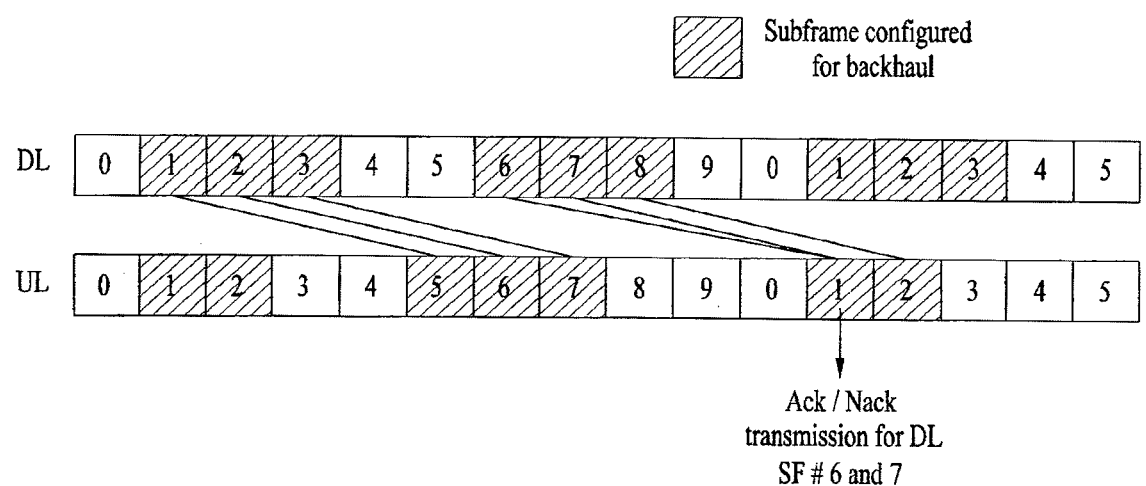
FIG. 10 is a diagram showing the case where the number of DL subframes associated with one UL subframe is changed over time.

FIG. 10 shows the case in which the number of DL subframes associated with one UL subframe is changed over time. As shown in FIG. 10, asymmetric backhaul allocation in which the number of UL backhaul subframes is less than the number of DL backhaul subframes in an FDD system may be considered. FIG. 10 shows the case in which a UL subframe #0 located behind a DL subframe #6 by 4 ms is not allocated as a backhaul subframe. There are various reasons why the UL subframe #0 is not allocated as the backhaul subframe. For example, it is assumed that a subframe in which the RN receives SPS transmission from the UE with periodicity of 10 ms is set to a first subframe (that is, every UL subframe #0) of an uplink radio subframe. In this case, the RN should transmit ACK/NACK for the PDSCH transmitted in two DL subframes #6 and #7 from the eNB in the UL subframe #1. That is, ACK/NACK for downlink transmission in two DL backhaul subframes DL SF#6 and #7 should be transmitted in the UL backhaul subframe #1, but only ACK/NACK for downlink transmission in one DL subframe is transmitted in each of the remaining UL backhaul subframes UL SF #2, #5, #6 and #7.

In FIG. 10, since the maximum number of DL backhaul subframes associated with one UL backhaul subframe is 2, the RN should be allocated a total of two ACK/NACK resource sets via a higher layer signal. More specifically, in a MIMO system in which a maximum of 2 codewords is transmitted per downlink transmission, since individual ACK/NACK is generated on a codeword-by-codeword basis, a maximum of four ACK/NACK resources is necessary. Since one ACK/NACK resource set includes two ACK/NACK resources, a total of two ACK/NACK resource sets needs to be allocated. Alternatively, as an extension of the example of FIG. 10, it may be assumed that ACK/NACK for downlink transmission in X DL subframes should be transmitted in a certain UL subframe and ACK/NACK for downlink transmission in DL subframes less in number than X should be transmitted in other UL subframes. In this case, the RN should be allocated a total of X ACK/NACK resource sets.

If an uplink ACK/NACK transmitter is allocated a plurality of ACK/NACK resource sets by a higher layer, there is a need for a rule for determining which ACK/NACK resource set is used for ACK/NACK transmission for which DL subframe. Additionally, if the number of DL subframes associated with one UL subframe is less than the number of allocated ACK/NACK resource sets, there is a need for a rule for determining which ACK/NACK resource set should be used in one UL subframe. If such a rule is not defined, since the uplink ACK/NACK transmitter cannot determine which ACK/NACK feedback is for downlink transmission for which DL subframe, an ACK/NACK response may not be accurately obtained.

The present invention proposes a method of semi-statically allocating/setting an ACK/NACK resource set to a downlink receiver by a higher layer and a method of determining a DL subframe associated with an ACK/NACK resource set to be used in each UL subframe if the number of DL subframes associated with each UL subframe is changed. In the present invention, if ACK/NACK for downlink transmission is transmitted via PUCCH resources, "ACK/NACK resources" may be interpreted as having the same meaning as "PUCCH resources". The principle of the present invention is applicable to a TDD system and an FDD system.

Although the RN which receives downlink transmission from the eNB transmits uplink ACK/NACK in the example associated with FIG. 10, the present invention is not limited thereto and is applicable to all cases in which a downlink receiver (e.g., a UE or an RN (backhaul downlink receiver)) transmits uplink ACK/NACK for downlink transmission from a downlink transmitter (e.g., an eNB or an RN (access downlink transmitter)). In the following description, unless otherwise stated, an entity for transmitting ACK/NACK for downlink transmission is referred to as a receiver and an entity for performing downlink transmission and receiving ACK/NACK therefor is referred to as a transmitter.

Although, for clarity of description, one serving cell is set to a receiver in the following description, the scope of the present invention is not limited thereto and the principle of the present invention is applicable to case in which more than one serving cell is set to the receiver.

Embodiment 1

The present embodiment relates to a method of deciding a rule for mapping one ACK/NACK resource set to one DL subframe if the ACK/NACK resource set allocated to a receiver is indexed. For example, mapping a DL subframe index A to an ACK/NACK resource set index a means that ACK/NACK for downlink transmission in the DL subframe A is transmitted using the ACK/NACK resource set index a. Therefore, using which ACK/NACK resource set an ACK/NACK response for downlink transmission is transmitted in a certain DL subframe may be readily determined For example, if N ACK/NACK resource sets which may be used in one UL subframe are allocated to the UE, the indexes of the allocated ACK/NACK resource sets are 0, 1, . . . , and N−1. Meanwhile, if the number of DL subframes associated with one UL subframe is M (M≥1), ACK/NACK for downlink transmission in M DL subframes is transmitted in one UL subframe. In other words, if one or more DL subframes (subframe $n-k_t$, t=0, 1, 2, ..., and M−1) are associated with one UL subframe (subframe n), it is represented that the ACK/NACK resource set ($n^{(1)}_{PUCCH,t}$, t=0, 1, 2, ..., M−1) corresponds to a subframe $n-k_t$. That is, ACK/NACK for downlink transmission in the DL subframe $n-k_t$ is transmitted using $n^{(1)}_{PUCCH,t}$ in a UL subframe n.

The rule for mapping M DL subframes to the ACK/NACK resource sets may be set as follows. M DL subframes associated with one UL subframe may be sequentially mapped to ACK/NACK resource sets 0, 1, 2, ... starting from a DL subframe temporally closest to one UL subframe. More specifically, the ACK/NACK resource set 0 may be mapped to a first DL subframe (in order closer to one UL subframe) among DL subframes spaced apart from one UL subframe by a previously defined processing time (e.g., a time used to generate ACK/NACK) or more, and the subsequent DL subframes may be sequentially mapped to the ACK/NACK resource sets 1, 2, .... For example, using a subframe n in which ACK/NACK is transmitted as a reference, in the FDD system, subframes associated with the subframe n among a subframe n−4 and previous subframes thereof may be sequentially mapped to the ACK/NACK resource sets 0, 1, 2, ... in order closer to the subframe n and, in the TDD system, subframes belonging to n−k may be mapped to the ACK/NACK resource sets 0, 1, 2, ... in order closer to the subframe n. If only one DL subframe is associated with one UL subframe, the DL subframe may be mapped to the ACK/NACK resource set 0.

Referring to FIG. 10, an example in which two ACK/NACK resource sets (sets 0 and 1) are allocated to a receiver by a higher layer will be described. ACK/NACK resource set 0 may be mapped to a closest DL subframe #7 among DL subframes associated with a UL subframe #1 and the ACK/NACK resource set 1 may be mapped to a next closest DL subframe #6. That is, ACK/NACK for downlink transmission received in the DL subframe #7 may be transmitted in the UL subframe #1 using the ACK/NACK resource set 0 and ACK/NACK for downlink transmission received in the DL subframe #6 may be transmitted in the UL subframe #1 using the ACK/NACK resource set 1. Meanwhile, since the number of DL subframes associated with another UL subframe (e.g., a UL subframe #2) is 1 (e.g., a DL subframe #8), ACK/NACK for downlink transmission in the DL subframe may be transmitted in the UL subframe #2 using ACK/NACK resource set 0.

In other words, a DL subframe $n-k_t$ (t=0, 1, 2, ..., and M−1) associated with a UL subframe n may correspond to $n^{(1)}_{PUCCH,t}$ in ascending order of a value $k_t$. For example, if three DL subframes associated with the subframe n are n−4, n−8 and n−9, the subframe n−4 having a smallest value $k_t$ corresponds to $n^{(1)}_{PUCCH,0}$, the subframe n−8 corresponds to $n^{(1)}_{PUCCH,1}$, and the subframe n−9 corresponds to $n^{(1)}_{PUCCH,2}$. Therefore, ACK/NACK for downlink transmission in the DL subframe $n-k_t$ is transmitted in the UL subframe n using $n^{(1)}_{PUCCH,t}$.

The mapping relationship between the DL subframes associated with one UL subframe with ACK/NACK resource set indexes may be set in reverse order of the above description. For example, the M DL subframes associated with one UL subframe may be sequentially mapped to the ACK/NACK resource sets 0, 1, 2, ... starting from a farthest from one UL subframe in terms of time. In the example of FIG. 10, with respect to two DL subframes SF#6 and SF#7 associated with a UL subframe #1, the DL subframe #6 may be mapped to the ACK/NACK resource set 0 and the DL subframe #7 may be mapped to the ACK/NACK resource set 1.

In other words, a DL subframe $n-k_t$ (t=0, 1, 2, ..., and M−1) associated with a UL subframe n may correspond to $n^{(1)}_{PUCCH,t}$ in descending order of the value $k_t$. For example, if three DL subframes associated with the subframe n are n−4, n−8 and n−9, the subframe n−9 having a largest value $k_t$ correspond to $n^{(1)}_{PUCCH,t}$, the subframe n−8 corresponds to $n^{(1)}_{PUCCH,1}$, and the subframe n−4 corresponds to $n^{(1)}_{PUCCH,2}$. Therefore, ACK/NACK for downlink transmission in the DL subframe $n-k_t$ is transmitted in the UL subframe n using $n^{(1)}_{PUCCH,t}$.

In the present embodiment, a method of mapping M DL subframes to N ACK/NACK resource sets in predetermined time order if M DL subframes are associated with one UL subframe and N ACK/NACK resource sets are set with respect to a receiver is proposed. Here, the ACK/NACK resource sets may be mapped to the DL subframes starting from a lowest index value (set 0) in predetermined time order (in order closer to or farther from one UL subframe) in one-to-one correspondence. A plurality of associated DL subframes may be contiguous subframes or discontiguous subframes.

Embodiment 2

In the present embodiment, as in Embodiment 1, a method of applying a method of mapping DL subframes associated with one UL subframe to ACK/NACK resource sets to an ACK/NACK bundling operation will be described.

The ACK/NACK bundling operation means that the final 1 or 2 ACK/NACK bits obtained by performing a logical AND operation with respect of a decoding result (that is, ACK or NACK) of downlink transmission in a plurality of downlink subframes are transmitted over one ACK/NACK resource. If downlink MIMO transmission is applied, a maximum of 2 codewords may be transmitted per PDSCH. In the case of ACK/NACK bundling, since a logical AND operation is performed per codeword across multiple DL subframes, 1 ACK/NACK bit is generated if 1 codeword is transmitted and two ACK/NACK bits are generated if 2 codewords are transmitted. For example, if 1 codeword is transmitted, the ACK/NACK bundling result may be expressed by ACK if all downlink transmissions in a plurality of downlink subframes are successfully decoded and may be expressed by NACK if decoding of any one of the downlink transmissions fails. If ACK/NACK bundling is applied, although all individual ACK/NACK information may not be clearly expressed, ACK/NACK bundling may be advantageously used in that overhead of control information is reduced in a system with limited control information transmit capacity.

If the maximum number of DL subframes associated with one UL subframe is N, N ACK/NACK resource sets (sets 0, 1, ..., and N−1) may be allocated to one receiver. The maximum number of DL subframes associated with one UL subframe being N means that the number of DL subframes associated with one UL subframe is N or less. If the number of DL subframes associated with a specific UL subframe is M (M≤N), the receiver may select M sets from among N ACK/NACK resource sets and map the M ACK/NACK resource sets to the M DL subframe in one-to-one correspondence. If the ACK/NACK resource sets are mapped to the DL subframes as in Embodiment 1, the receiver may select the ACK/NACK resource sets 0, 1, ..., and M and map the M DL subframes to the ACK/NACK resource sets 0, 1, ..., and M in order closer to (or farther from) one UL subframe. If ACK/NACK bundling is not performed, individual ACK/NACK information for downlink transmission in each DL subframe may be used using ACK/NACK resources mapped to each DL subframe. However, if ACK/NACK bundling is applied, the following operation may be performed.

If PDSCH transmission is actually performed in m DL subframes of M associated DL subframes, ACK/NACK information for transmission of m PDSCHs may be fed back through ACK/NACK bundling. The ACK/NACK bundling result may be transmitted via an ACK/NACK resource set mapped to a last DL subframe in which the PDSCH is transmitted (a latest DL subframe, in which the PDSCH is received, from among m DL subframes, or a DL subframe closest to one UL subframe in teens of time). That is, ACK information may be transmitted using the ACK/NACK resource set mapped to the last DL subframe in which the PDSCH is transmitted when m PDSCHs are successfully decoded and, otherwise, NACK information may be transmitted using the ACK/NACK resource set mapped to the last DL subframe in which the PDSCH is transmitted.

If the ACK/NACK set in which the ACK/NACK bundling result is transmitted is determined, the transmitter may determine not only the PDSCH decoding result of the receiver but also whether the receiver receives all m control channels (PDCCHs or R-PDCCHs) for scheduling m PDSCHs. More specifically, if the receiver does not receive the control channels in the last DL subframe in which the PDSCH is transmitted from the transmitter, without using the ACK/NACK resource set mapped to the last DL subframe, the ACK/NACK bundling result is transmitted using another ACK/NACK resource set (an ACK/NACK resource set mapped to the last DL subframe in which the receiver receives the PDSCH). Accordingly, the transmitter may determine whether the receiver receives up to the last PDSCH depending on using which ACK/NACK resource set the ACK/NACK bundling result is transmitted.

The control channel transmitted from the transmitter may include a control channel number count value. That is, the transmitter may include a field having a value which gradually increases for each control channel. Such a control channel number count field may be configured in a manner similar to a downlink assignment index (DAI) field included in a PDCCH or in a manner of reusing another field of the control channel, but the present invention is not limited thereto. The receiver may check control channel number count information and determine whether a missed control channels is present. If the transmitter transmits four control channels and the control channel count values checked by the receiver are 0, 2 and 3, the receiver may recognize that the control channel corresponding to the control channel count value 1 is not detected. Then, since the receiver does not receive one PDSCH, ACK/NACK information corresponding thereto may be generated and transmitted. Meanwhile, if the transmitter transmits four control channels and the control channel count values checked by the receiver are 0, 1 and 2, the receiver may determine that the control channel is detected. Accordingly, even when the receiver does receive one PDSCH, the receiver feeds ACK information back if all PDSCHs received by the receiver are successfully decoded. In this case, the transmitter may recognize that the receiver has missed the PDSCH because the index of the ACK/NACK resource set in which the receiver feeds the ACK information back is not mapped to the last DL subframe in which the PDSCH is actually transmitted by the transmitter but is mapped to the last DL subframe in which the PDSCH is received by the receiver. Thus, it is possible to perform an accurate ACK/NACK operation.

An embodiment of the present invention in the case in which ACK/NACK bundling is applied will be described with reference to FIG. 11.

Figure 11:
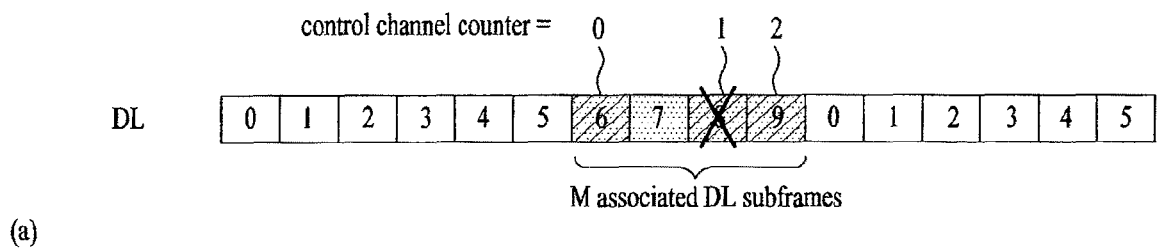
FIG. 11 is a diagram illustrating a mapping relationship between DL subframes and ACK/NACK resources and an ACK/NACK feedback method according to an embodiment of the present invention.
Figure 11:
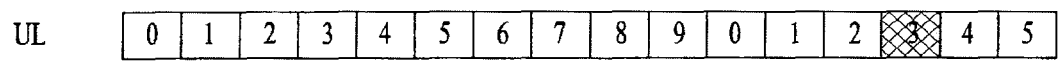
Figure 11:
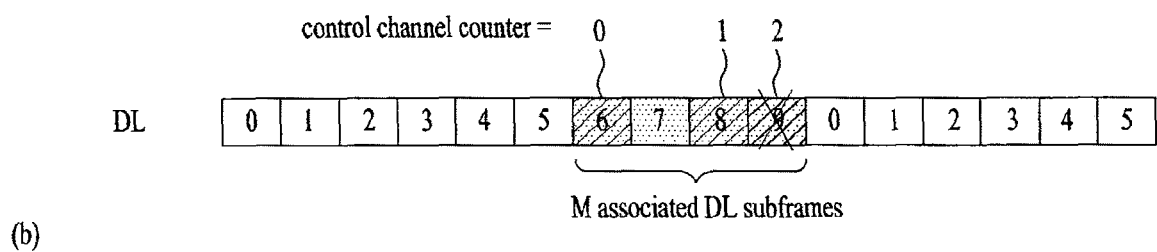
Figure 11:
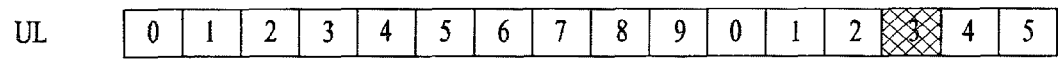
Figure 11:
Figure 11:

In FIG. 11, it is assumed that the maximum number of DL subframes associated with one UL subframe is 5. That is, N=5 and N ACK/NACK resource sets are allocated to a receiver. In addition, DL subframes #6, #7, #8 and #9 are associated with one UL subframe #3. That is, ACK/NACK for PDSCH transmission in the DL subframes #6, #7, #8 and #9 is transmitted in the UL subframe #3. That is, M=4 and the receiver may select M sets (sets 0, 1, 2 and 3) from among N ACK/NACK resource sets and map the M sets to M DL subframes. For example, the ACK/NACK resource sets 0, 1, 2 and 3 may be mapped to DL subframes #9, #8, #7 and #6, respectively. Here, it is assumed that the transmitter actually transmits PDSCHs in the DL subframes #6, #8 and #9. That is, m=3 and the control channel number count values corresponding to the DL subframes #6, #8 and #9 correspond to 0, 1 and 2. If the receiver successfully decodes all the PDSCHS in DL subframes #6, #8 and #9, ACK information may be transmitted and, otherwise, NACK information may be transmitted via the ACK/NACK resource set 0 mapped to the last DL subframe #9.

FIG. 11(a) shows the case in which the receiver misses downlink transmission in the DL subframe #8. That is, FIG. 11(a) shows the case in which the transmitter transmits PDSCHs in the DL subframes #6, #8 and #9 but the receiver receives PDSCHs only in the DL subframes #6 and #9. In this case, since the receiver recognizes that the count values of the control channels received by the receiver are 0 and 2, the receiver recognizes that one control channel has missed. Accordingly, the receiver may generate NACK information and feed the generated NACK information back to the transmitter using the PUCCH resource set 0 mapped to the last DL subframe (that is, the DL subframe #9) in which the PDSCH is received. Then, the transmitter may recognize that the receiver does not successfully decode some of the PDSCHs transmitted in the DL subframes #6, #8 and #9 and perform a subsequent operation (e.g., retransmission).

FIG. 11(b) shows the case in which the receiver misses downlink transmission in the DL subframe #9. That is, FIG. 11(b) shows the case in which the transmitter transmits PDSCHs in DL subframes #6, #8 and #9 but the receiver receives PDSCHs only in DL subframes #6 and #8. In this case, since the count values of the control channels received by the receiver are 0 and 1, the receiver does not recognize that the last control channel has missed. Accordingly, the receiver may generate ACK information and feed the generated ACK information back to the transmitter using the PUCCH resource set 1 mapped to the last DL subframe (that is, DL subframe #8) in which the PDSCH is received. Then, although the receiver feeds the ACK information back, because the PUCCH resource index used in the feedback of the ACK information does not correspond to the PUCCH resource corresponding to the last DL subframe (that is, the DL subframe #9) in which the PDSCH is actually transmitted by the transmitter, the transmitter may recognize that the receiver does not successfully decode some of the PDSCHs transmitted in the DL subframes #6, #8 and #9 and perform a subsequent operation (e.g., retransmission).

Embodiment 3

In the present embodiment, as in Embodiment 1, a method of applying a method of mapping DL subframes associated with one UL subframe to ACK/NACK resource sets to an ACK/NACK multiplexing operation will be described.

ACK/NACK multiplexing may be referred to as ACK/NACK selection or ACK/NACK channel selection and may be a method of expressing the result of decoding the PDSCHs transmitted in a plurality of different DL subframes by selection of one of a plurality of ACK/NACK resource sets. Here, a logical AND operation is not performed with respect to the result of decoding the PDSCHs transmitted in the plurality of different DL subframes. However, spatial bundling for performing a logical AND operation with respect to the result of decoding two codewords in one DL subframe may be applied. The ACK/NACK multiplexing operation may be, for example, performed according to the rule for mapping the ACK/NACK resources and the ACK/NACK information shown in Tables 3 to 5. The present invention is not limited thereto and a new ACK/NACK mapping rule may be defined and used. The present embodiment relates to the method of determining ACK/NACK resources used for the ACK/NACK multiplexing operation and the other part of the ACK/NACK multiplexing operation is not specially limited.

If ACK/NACK multiplexing is applied and PDSCHs are received in m DL subframes, m ACK/NACK resource sets may be used and one ACK/NACK resource set may be selected therefrom. However, the present invention is not limited thereto and the number of ACK/NACK resource sets necessary for ACK/NACK multiplexing may be less than or greater than m. For example, in addition to the decoding success/failure result of the PDSCH transmitted in one DL subframe, if the result that the control channel is not received in the DL subframe needs to be expressed by ACK/NACK information, more than m ACK/NACK resource sets may be necessary. As another example, if whether the control channel is received in which a DL subframe is not expressed by ACK/NACK information, it may be expressed by one ACK/NACK resource by multiplexing a plurality of decoding results using QPSK modulation (constellation mapping) in one ACK/NACK resource. In this case, less than m ACK/NACK resource sets may be necessary.

When ACK/NACK information for downlink transmission in m DL subframes is fed back, the number of ACK/NACK resource sets may be changed according to various ACK/NACK multiplexing methods and the number of ACK/NACK resource sets may be expressed by k(m) which is a function of m. Even when such an operation is supported, the above-described ACK/NACK resource set configuration method is applicable.

For example, if ACK/NACK for PDSCHs received in m DL subframes is transmitted in one UL subframe, k(m) ACK/NACK resource sets may be necessary depending on whether or not ACK/NACK multiplexing is applied. In this case, the receiver may use k(m) ACK/NACK resource sets (sets 0, 1, . . . , and k(m)−1) from a smallest ACK/NACK resource set index (in ascending order). Alternatively, the receiver may use k(m) ACK/NACK resource sets (sets 0, 1, . . . , and k(m)−1) from a largest ACK/NACK resource set index (in descending order).

The receiver may transmit ACK/NACK information for downlink transmission in m DL subframes using PUCCH resources according to the rule for mapping the ACK/NACK resources and the ACK/NACK information defined in the ACK/NACK multiplexing (or ACK/NACK channel selection) scheme using the determined k(m) ACK/NACK resource sets.

Embodiment 4

The present embodiment relates to a method of mapping one ACK/NACK resource set to a control channel number count value in a control channel.

As described above, if a plurality of DL subframes is associated with one UL subframe, in order to determine whether the receiver has missed a control channel, the transmitter increases the control channel number count value one by one whenever a PDSCH (PDSCH indicated by detection of a corresponding control channel) and the receiver determines whether the control channel number count value is continuously increased so as to recognize whether the receiver has missed the transmitted control channel. In this case, the indexes of the semi-statically allocated ACK/NACK resource sets may be mapped to the control channel number count values.

For example, in the example of FIG. 10, if a PDSCH indicated by the detection of a control channel having a control channel number count value of 0 is transmitted in a DL subframe #6 and a PDSCH indicated by the detection of a control channel having a control channel number count value of 1 is transmitted in a DL subframe #7, ACK/NACK resource set 0 may be mapped to the DL subframe #6 and ACK/NACK resource set 1 may be mapped to the DL subframe #7.

In the example of FIG. 10, if no PDSCH (control channel indicating PDSCH transmission) is transmitted in the DL subframe #6 and a PDSCH indicated by the detection of a control channel having a control channel number count value of 0 is transmitted in the DL subframe #7, ACK/NACK resource set 0 may be mapped to the DL subframe #7.

The receiver may perform the same operation as the above-described embodiments based on the mapping relationship between the control channel number count value and the ACK/NACK resource set. Hereinafter, an application example of the present invention will be described with reference to FIG. 11. In the example of FIG. 11, it is assumed that the control channel number count values 0, 1 and 2 are respectively mapped to the ACK/NACK resource sets 0, 1 and 2.

For example, in the example of FIG. 11, if it is assumed that the receiver does not miss the PDSCHs in the DL subframes #6, #8 and #9, ACK/NACK for downlink transmission in the DL subframe #6 (control channel number count value=0) may be transmitted using the ACK/NACK resource set 0, ACK/NACK for downlink transmission in the DL subframe #8 (control channel number count value=1) may be transmitted using the ACK/NACK resource set 1, and ACK/NACK for downlink transmission in the DL subframe #9 (control channel number count value=2) may be transmitted using the ACK/NACK resource set 2, on the UL subframe #3.

As another example, if ACK/NACK bundling is applied, bundled ACK/NACK information may be transmitted using ACK/NACK resources mapped to the last (or highest) control channel number count value of the DL subframes associated with one UL subframe. For example, in the example of FIG. 11, bundled ACK/NACK information may be transmitted in the UL subframe #3 using the ACK/NACK resource set 2 mapped to the control channel number count value=2. In the example of FIG. 11(*a*), NACK information (indicating that reception of the PDSCH corresponding to the control channel number count value=1 fails) may be transmitted as bundled ACK/NACK information in the UL subframe #3 using the ACK/NACK resource set 2 mapped to the control channel number count value=2. In the example of FIG. 11(*b*), bundled ACK/NACK information may be transmitted in the UL subframe #3 using the ACK/NACK resource set 1 mapped to the control channel number count value=1. At this time, although the bundled ACK/NACK information indicates ACK, the transmitter recognizes that the receiver does not accurately receive/decode all PDSCHs because the ACK/NACK resource set corresponding to the control channel number count value of 1 is used.

As another example, if ACK/NACK multiplexing (or channel selection) is applied and ACK/NACK for the PDSCHs received in m DL subframes is transmitted in one UL subframe, it may be assumed that k(m) ACK/NACK resource sets are necessary depending on whether or not ACK/NACK multiplexing is applied. In this case, the receiver may use k(m) ACK/NACK resource sets (sets 0, 1, ..., and k(m)−1) from a lowest ACK/NACK resource set index (in ascending order). Alternatively, the receiver may use k(m) ACK/NACK resource sets (sets m−1, m−2, ..., and m−k(m)) from a highest ACK/NACK resource set index (in descending order).

Embodiment 5

In the present embodiment, a method of semi-statically configuring a plurality of ACK/NACK resource sets to a receiver will be described.

For example, each ACK/NACK resource set may be individually signaled to the receiver. That is, a transmitter may transmit resource indexes of N ACK/NACK resource sets (sets 0, 1, ..., and (N−1)) to the receiver through higher layer signaling (e.g., RRC signaling).

As another example, the transmitter may transmit only a resource index (time/frequency/sequence resource) of one criterion set (e.g., set 0) among N ACK/NACK resource sets to the receiver through higher layer signaling (e.g., RRC signaling). The resource indexes of the remaining N−1 ACK/NACK resource sets may be deduced from the resource index of one criterion set. For example, the resource index of the ACK/NACK resource set 1 is set to the resource index of the ACK/NACK resource set 0+1 and the resource index of the ACK/NACK resource set 2 is set to the resource index of the ACK/NACK resource set 0+2. Therefore, the transmitter and the receiver may determine and use the resource index of each ACK/NACK resource set without separate signaling according to the same rule. Accordingly, it is possible to reduce higher layer signaling size and overhead.

Figure 12:
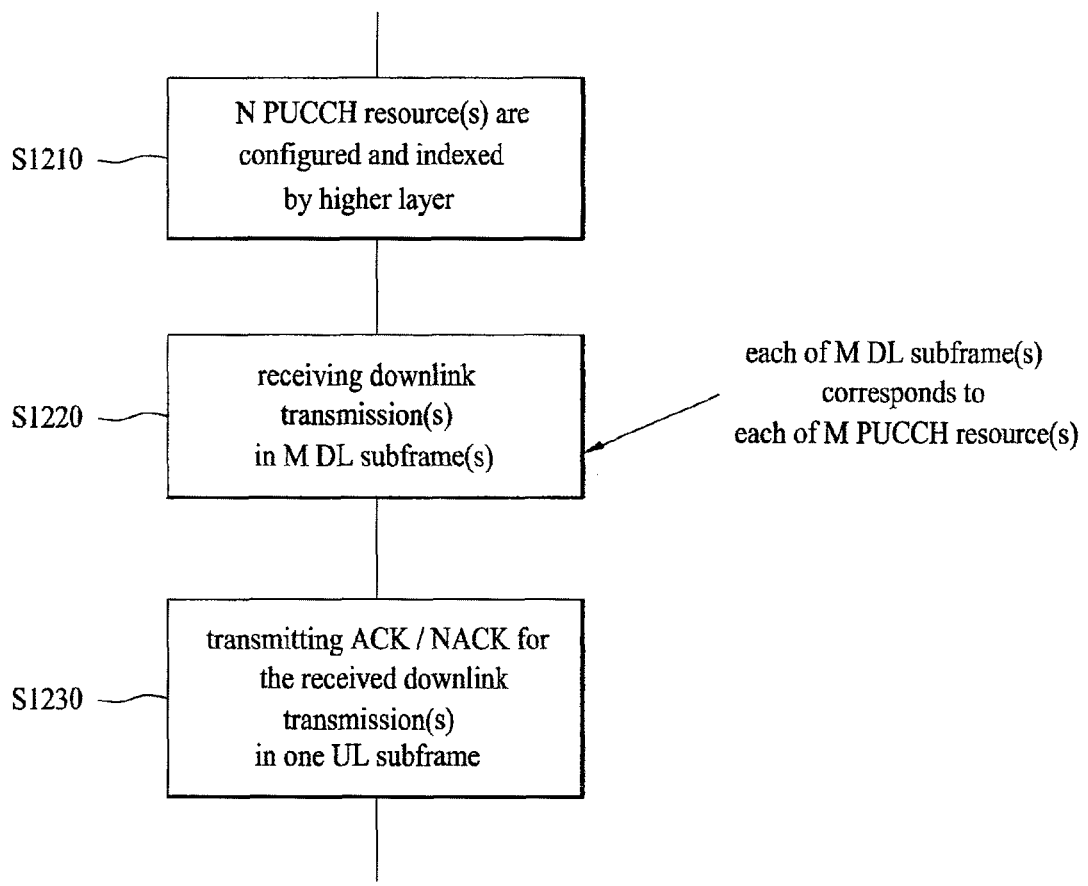
FIG. 12 is a flowchart illustrating a method for transmitting ACK/NACK information for downlink transmission according to an embodiment of the present invention.

FIG. 12 is a flowchart illustrating a method for transmitting ACK/NACK information for downlink transmission according to an embodiment of the present invention.

In step S1210, with respect to a receiver, N PUCCH resources (that is, N ACK/NACK resource sets) are configured and indexed by a higher layer. For example, if PUCCH resources are expressed by $n^{(1)}_{PUCCH}$, the N PUCCH resources may be indexed by 0, 1, 2, ..., and N−1, respectively. That is, $n^{(1)}_{PUCCH,t}$ (t=0, 1, 2, ..., N−1) may be configured via the higher layer. The N PUCCH resources may be semi-statically configured and indexed and N PUCCH resources may correspond to a maximum number of PUCCH resources which may be used in one uplink subframe.

In step S1220, downlink transmission(s) may be received from the transmitter in M (1≤M≤N) downlink subframes (that is, downlink subframe sets). Here, one of the M downlink subframes may correspond to one of the M PUCCH resources.

For example, as in the example described in Embodiment 1, if the M downlink subframes are expressed by n−$k_t$ (t=0, 1, 2, ..., and M−1) and the M ACK/NACK resource sets are expressed by $n^{(1)}_{PUCCH,t}$ (t=0, 1, 2, ..., M−1), $n^{(1)}_{PUCCH,t}$ corresponds to a subframe n−$k_t$. Here, the $k_t$ value may correspond to the index t such that a smallest $k_t$ value corresponds to t=0 and a next smallest $k_t$ value corresponds to t=1. Thus, a DL subframe n−$k_t$ closest to one uplink subframe n is mapped to a PUCCH resource index 0 ($n^{(1)}_{PUCCH,0}$).

In step S1230, ACK/NACK information for the downlink transmission(s) received in the M downlink subframes in step S1220 may be transmitted to the transmitter in one uplink subframe associated with the M downlink subframes. For example, ACK/NACK bundling or ACK/NACK channel selection may be set with respect to the receiver and the receiver may transmit the ACK/NACK information using one of the M PUCCH resources.

The downlink transmission(s) received in the M downlink subframes may be PDSCH transmission(s) indicated by detection of a corresponding control channel, and the control channel may be an R-PDCCH. The control channel may include control channel number count information. Thus, the receiver may determine whether the control channel has been missed and the transmitter may determine whether the receiver has received a last control channel.

The method of FIG. 12 is applicable to TDD and is applicable to an example in which a downlink transmitter is an eNB and a downlink receiver is an RN.

In the above-described various embodiments of the present invention, for clarity of description, it is assumed that one serving cell is set to the receiver and a downlink transmission is received over one downlink carrier (or a DL cell). The scope of the present invention is not limited thereto and the principle of the present invention is equally applicable to the case in which more than one serving cell is set as the receiver.

In the above-described various examples of the present invention, for clarity of description, ACK/NACK feedback for a PDSCH indicated by detection of a corresponding PDCCH (or an R-PDCCH) is described. However, the scope of the present invention is not limited thereto and the principle of the present invention is equally applicable to the case in which one or more of an ACK/NACK feedback for a PDSCH indicated by detection of a corresponding PDCCH (or an R-PDCCH), an ACK/NACK feedback for a PDSCH (that is, an SPS PDSCH) without a corresponding PDCCH (or an R-PDCCH) or an ACK/NACK feedback for a PDCCH (or an R-PDCCH) indicating SPS release are combined.

In addition, matters described in the various embodiments of the present invention for the ACK/NACK transmission method may be independently applicable or two or more embodiments may be simultaneously applicable. For clarity, a repeated description will be omitted.

Figure 13:
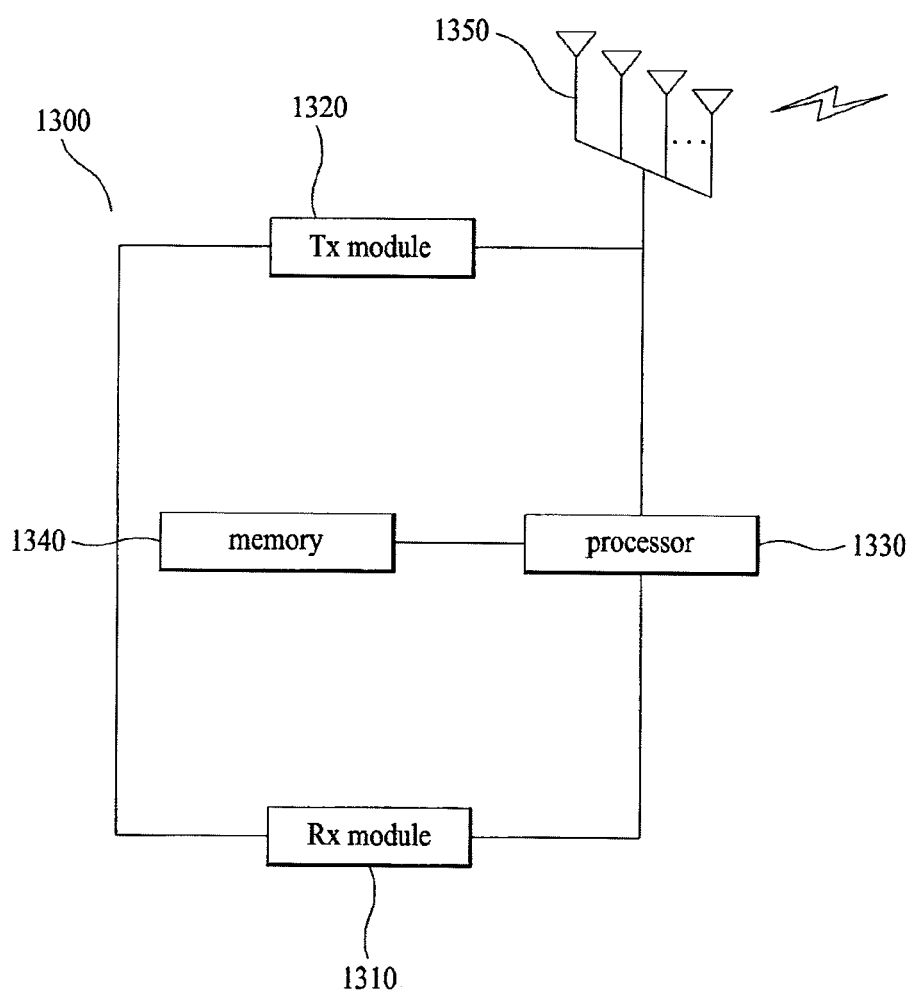
FIG. 13 is a diagram showing the configuration of an apparatus for transmitting ACK/NACK information according to an embodiment of the present invention.

FIG. 13 is a diagram showing the configuration of an apparatus for transmitting ACK/NACK information according to an embodiment of the present invention.

Referring to FIG. 13, the apparatus 1300 for transmitting the ACK/NACK information according to the present invention may include a reception (Rx) module 1310, a transmission (Tx) module 1320, a processor 1330, a memory 1340 and a plurality of antennas 1350. The plurality of antennas 1350 means an apparatus supporting MIMO transmission and reception. The Rx module 1310 may receive a variety of signals, data and information from an external device. The Tx module 1320 may transmit a variety of signals, data and information to an external device. The processor 1330 may control the overall operation of the apparatus 1300.

The apparatus 1300 according to one embodiment of the present invention may be configured to transmit ACK/NACK information for downlink transmission in a wireless communication system. The processor 1330 may be configured to receive the downlink transmission from a transmitter in a downlink subframe set including M (M≥1) downlink subframes through the Rx module 1310. The processor 1330 may be configured to transmit the ACK/NACK information for the downlink transmission in the downlink subframe set to the transmitter in one uplink subframe associated with the downlink subframe set through the Tx module 1320. M PUCCH resources are configured with respect to the apparatus 1300 and each of the M downlink subframes may correspond to each of the M PUCCH resources.

A transmission apparatus (not shown) for transmitting the downlink transmission to the apparatus 1300 of FIG. 13 and configuring ACK/NACK resources (that is, PUCCH resources) which will be used by the apparatus 1300 may be configured. The transmission apparatus may include a Tx module, an Rx module, a processor, a memory and an antenna.

The processor 1330 of the apparatus 1300 for transmitting the ACK/NACK information serves to process information received by the apparatus 1300 and information to be transmitted, and the memory 1340 may store the processed information for a predetermined time and may be replaced with a component such as a buffer (not shown).

The overall configuration of the above apparatus may be implemented by independently applying the matters described in the above-described various embodiments of the present invention or simultaneously applying two or more embodiments. A repeated description will be omitted for clarity.

In the description of FIG. 13, the description of the transmission apparatus is equally applicable to a base station or a relay as a downlink transmission entity or an uplink reception entity and the description of the reception apparatus is equally applicable to a user equipment or a relay as a downlink reception entity or an uplink transmission entity.

The embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention are applicable to various mobile communication systems. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for receiving acknowledgement/negative acknowledgement (ACK/NACK) information transmitted in response to a downlink transmission in a base station (BS) of a wireless communication system, the method comprising:
    transmitting, by the BS to a relay node (RN), one or more relay physical downlink control channels (R-PDCCHs) for scheduling the downlink transmission;
    transmitting, by the BS to the RN, the downlink transmission according to the one or more R-PDCCHs in a downlink subframe set including M downlink subframes, where M is a positive integer greater than 1; and
    receiving, by the BS from the RN, ACK/NACK information for the downlink transmission in the downlink subframe set in one uplink subframe associated with the downlink subframe set,
    wherein the downlink subframe set and the uplink subframe are configured for a time division duplex (TDD),
    wherein the one or more R-PDCCHs are control channels different from a physical downlink control channel (PDCCH),
    wherein N physical uplink control channel (PUCCH) resources respectively having indexes $0, 1, 2, \ldots,$ and $N-1$ are configured by a higher layer, where $M \leq N$ and N is a positive integer greater than 1,
    wherein each of M PUCCH resources respectively having the indexes $0, 1, 2, \ldots,$ and $M-1$ among the configured N PUCCH resources corresponds to each of the M downlink subframes, and
    wherein each of the M downlink subframes associated with the one uplink subframe is sequentially mapped to each of the M PUCCH resources starting from a downlink subframe among the M downlink subframes that is closest in time to the one uplink subframe.

2. The method according to claim 1, wherein:
    the one uplink subframe is a subframe n, the M downlink subframes are subframe $n-k_t$, where $t=0, 1, 2, \ldots,$ and $M-1$, and t is a positive integer,
    the M PUCCH resources are $n^{(1)}_{PUCCH,t}$, where $t=0, 1, 2, \ldots, M-1$, and
    $n^{(1)}_{PUCCH,t}$ corresponds to the subframe $n-k_t$.

3. The method according to claim 2, wherein the $k_t$ value corresponds to $t=0, 1, 2, \ldots, M-1$ in ascending order.

4. The method according to claim 1, wherein the ACK/NACK information is transmitted using one of the M PUCCH resources.

5. A base station (BS) for receiving acknowledgement/negative acknowledgement (ACK/NACK) information transmitted in response to a downlink transmission in a wireless communication system, the BS comprising:
a plurality of antennas; and
a processor configured to:
support the transmitting ACK/NACK information by controlling the plurality of antennas,
transmit, to a relay node (RN) via the plurality of antennas, one or more relay physical downlink control channels (R-PDCCHs) for scheduling the downlink transmission,
transmit, to the RN via the plurality of antennas, the downlink transmission according to the one or more R-PDCCHs in a downlink subframe set including M downlink subframes, where M is a positive integer greater than 1, and
receive, form the RN via the plurality of antennas, the ACK/NACK information for downlink transmission in the downlink subframe set in one uplink subframe associated with the downlink subframe set,
wherein the downlink subframe set and the uplink subframe are configured for a time division duplex (TDD),
wherein the one or more R-PDCCHs are control channels different from a physical downlink control channel (PDCCH),
wherein N physical uplink control channel (PUCCH) resources respectively having indexes $0, 1, 2, \ldots,$ and $N-1$ are configured by a higher layer, where M<N and N is a positive integer greater than 1,
wherein each of M PUCCH resources respectively having the indexes $0, 1, 2, \ldots, M-1$ among the configured N PUCCH resources corresponds to each of the M downlink subframes, and
wherein each of the M downlink subframes associated with the one uplink subframe is sequentially mapped to each of the M PUCCH resources starting from a downlink subframe among the M downlink subframes that is closest in time to the one uplink subframe.

6. The BS according to claim 5, wherein:
the one uplink subframe is a subframe n, the M downlink subframes are subframe $n-k_t$, where $t=0, 1, 2, \ldots,$ and $M-1$, and t is a positive integer,
the M PUCCH resources are $n^{(1)}_{PUCCH,t}$, where $1, 2, \ldots, M-1$, and
the $n^{(1)}_{PUCCH,t}$ corresponds to the subframe $n-k_t$.

7. The BS according to claim 5, wherein the $k_t$ value corresponds to $t=0, 1, 2, \ldots, M-1$ in ascending order.

8. The BS according to claim 5, wherein the ACK/NACK information is transmitted using one of the M PUCCH resources.

* * * * *